United States Patent [19]
Masubuchi

[11] Patent Number: 6,148,416
[45] Date of Patent: *Nov. 14, 2000

[54] MEMORY UPDATE HISTORY STORING APPARATUS AND METHOD FOR RESTORING CONTENTS OF MEMORY

[75] Inventor: Yoshio Masubuchi, Kawasaki, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/853,867

[22] Filed: May 9, 1997

[30] Foreign Application Priority Data

Sep. 30, 1996 [JP] Japan .................................... 8-279027

[51] Int. Cl.[7] .................................................. G06F 11/00
[52] U.S. Cl. ............................................................. 714/15
[58] Field of Search ...................................... 395/180, 181, 395/182.13; 711/122, 130, 146, 149, 155; 714/1, 2, 15

[56] References Cited

U.S. PATENT DOCUMENTS

| | | |
|---|---|---|
| 3,588,829 | 6/1971 | Boland et al. . |
| 3,736,566 | 5/1973 | Anderson et al. .................... 340/172.5 |
| 3,761,881 | 9/1973 | Anderson et al. . |
| 3,803,560 | 4/1974 | DeVoy et al. . |
| 3,889,237 | 6/1975 | Alferness et al. . |
| 3,979,726 | 9/1976 | Lange et al. . |
| 4,020,466 | 4/1977 | Cordi et al. . |
| 4,044,337 | 8/1977 | Hicks et al. ............................. 364/200 |
| 4,164,017 | 8/1979 | Randell et al. ......................... 364/200 |
| 4,228,496 | 10/1980 | Katzman et al. . |
| 4,373,179 | 2/1983 | Katsumata . |
| 4,393,500 | 7/1983 | Imazeki et al. . |
| 4,403,284 | 9/1983 | Sacarisen et al. . |
| 4,413,327 | 11/1983 | Sabo et al. . |
| 4,426,682 | 1/1984 | Riffe et al. . |
| 4,443,849 | 4/1984 | Ohwada ................................. 364/200 |
| 4,459,658 | 7/1984 | Gabbe et al. ........................... 364/200 |
| 4,484,273 | 11/1984 | Stiffler et al. . |
| 4,513,367 | 4/1985 | Chan et al. . |
| 4,566,106 | 1/1986 | Check, Jr. . |
| 4,594,710 | 6/1986 | Matsunoshita et al. .................. 371/16 |
| 4,654,819 | 3/1987 | Stiffler et al. . |
| 4,682,328 | 7/1987 | Ramsay et al. ........................... 371/13 |

(List continued on next page.)

FOREIGN PATENT DOCUMENTS

| | | |
|---|---|---|
| 348 652 A2 | 1/1990 | European Pat. Off. . |
| 645 708 A1 | 3/1995 | European Pat. Off. . |
| 0 750 258 A2 | 12/1996 | European Pat. Off. . |
| 2 503 900 | 10/1982 | France . |
| 59-57351 | 4/1984 | Japan . |
| 59-144956 | 8/1984 | Japan . |
| WO 93/08528 | 4/1993 | WIPO . |

OTHER PUBLICATIONS

Hamacher et al., "Computer Organization", Third Ed., McGraw–Hill Pub Co, pp. 471–473, 1990.
Langholz et al., "Elements of Computer Organization", Prentice Hall, pp. 196–201, 1989.

(List continued on next page.)

Primary Examiner—Robert W. Beausoliel, Jr.
Assistant Examiner—Stephen C. Elmore
Attorney, Agent, or Firm—Finnegan, Henderson, Farabow, Garrett & Dunner, L.L.P.

[57] ABSTRACT

A before-image buffer controller is arranged separately from a memory controller and is connected to a system bus. When there is a write access request from a CPU to a cache memory corresponding to this CPU, the before-image buffer controller is automatically started in response to a command issued from this cache memory onto the system bus, and issues a command for reading previous data from a main memory. Since the before-image buffer controller operable independently of the memory controller is arranged in this way, a memory state restore function can be easily realized by using an existing computer system as it is without changing a memory controller.

11 Claims, 5 Drawing Sheets

6,148,416

Page 2

U.S. PATENT DOCUMENTS

| | | |
|---|---|---|
| 4,734,855 | 3/1988 | Banâtre et al. . |
| 4,740,969 | 4/1988 | Fremont .................................. 371/12 |
| 4,751,639 | 6/1988 | Corcoran et al. . |
| 4,757,442 | 7/1988 | Sakata ..................................... 364/200 |
| 4,805,095 | 2/1989 | Armstrong et al. . |
| 4,814,971 | 3/1989 | Thatte ..................................... 364/200 |
| 4,817,091 | 3/1989 | Katzman et al. . |
| 4,819,154 | 4/1989 | Stiffler et al. . |
| 4,819,232 | 4/1989 | Krings . |
| 4,852,092 | 7/1989 | Makita ..................................... 371/12 |
| 4,905,196 | 2/1990 | Kirrmann . |
| 4,912,707 | 3/1990 | Kogge et al. ............................. 371/12 |
| 4,924,466 | 5/1990 | Gregor et al. . |
| 4,941,087 | 7/1990 | Kap . |
| 4,958,273 | 9/1990 | Anderson et al. . |
| 4,964,126 | 10/1990 | Musicus et al. . |
| 4,965,719 | 10/1990 | Shoens et al. . |
| 5,157,663 | 10/1992 | Major et al. . |
| 5,214,652 | 5/1993 | Sutton . |
| 5,235,700 | 8/1993 | Alaiwan et al. ......................... 395/575 |
| 5,239,637 | 8/1993 | Davis et al. . |
| 5,247,618 | 9/1993 | Davis et al. . |
| 5,269,017 | 12/1993 | Hayden et al. .......................... 395/575 |
| 5,271,013 | 12/1993 | Gleeson . |
| 5,276,848 | 1/1994 | Gallagher et al. . |
| 5,293,613 | 3/1994 | Hayden et al. .......................... 395/575 |
| 5,295,259 | 3/1994 | Horne ...................................... 395/575 |
| 5,301,309 | 4/1994 | Sugano .................................... 395/575 |
| 5,313,647 | 5/1994 | Kaufman et al. . |
| 5,325,517 | 6/1994 | Baker et al. . |
| 5,325,519 | 6/1994 | Long et al. . |
| 5,327,532 | 7/1994 | Ainsworth et al. . |
| 5,355,490 | 10/1994 | Kou ......................................... 395/700 |
| 5,386,549 | 1/1995 | Norrie et al. ............................ 395/575 |
| 5,388,247 | 2/1995 | Goodwin et al. ........................ 395/425 |
| 5,408,649 | 4/1995 | Beshears et al. . |
| 5,488,716 | 1/1996 | Schneider et al. . |
| 5,488,719 | 1/1996 | Kaplan et al. . |
| 5,504,859 | 4/1996 | Gustafson et al. .................. 395/182.09 |
| 5,504,861 | 4/1996 | Crockett et al. . |
| 5,530,801 | 6/1996 | Kobayashi .......................... 395/182.11 |
| 5,557,737 | 9/1996 | Wilhite et al. ...................... 395/182.04 |
| 5,568,380 | 10/1996 | Brodnax et al. ......................... 364/184 |
| 5,586,294 | 12/1996 | Goodwin et al. ........................ 395/464 |
| 5,644,701 | 7/1997 | Takewaki ........................... 395/182.18 |
| 5,664,150 | 9/1997 | Isaac et al. . |
| 5,680,599 | 10/1997 | Jaggar ..................................... 395/591 |
| 5,701,448 | 12/1997 | White ...................................... 395/580 |
| 5,721,857 | 2/1998 | Glew et al. .............................. 395/401 |
| 5,745,672 | 4/1998 | Stiffler . |
| 5,745,730 | 4/1998 | Nozue et al. . |
| 5,751,939 | 5/1998 | Stiffler ................................ 395/182.13 |
| 5,761,403 | 6/1998 | Yamagishi ........................... 395/182.11 |
| 5,913,021 | 6/1999 | Masubuchi ......................... 395/182.13 |

OTHER PUBLICATIONS

Kun–Lung et al., "Error Recovery in Shared Memory Multiprocessors Using Private Caches," IEEE Transactions on Parallel and Distributed Systems, vol. 1, No. 2, (Apr. 1, 1990), pp. 231–240.

Philip A. Bernstein, "Sequoia: A Fault–Tolerant Tightly Coupled Multiprocessor for Transaction Processing," IEEE Computer, vol. 21, No. 2 (1988).

Rok Sosic, "History Cache: Hardware Support for Reverse Execution," Computer Architecture News, vol. 22, No. 5 (1994).

Banâtre, M., Gefflaut, A., and Morin, C., "Scalable Shared Memory Multiprocessors: Some Ideas to Make them Reliable," pp. 1–11.

Bowen, N.S. and Pradham, D.K., "Processor– and Memoruy–Based Checkpoint and Rollback Recovery," *IEEE Computer*, pp. 22–30 (Feb., 1993).

Lee, Y.–H. and Shin, K.G., "Rollback Propagation Detection and Performance Evaluation of FTMR$^2$M—A Fault–Tolerant Multiprocessor," *IEEE*, pp. 171–180 (1982).

Kubjak, C., Andre, J.P., Grandjean, B., Mathieu, D., and Rolland, J., "Penelope: A Recovery Mechanism for Transient Hardware Failures and Software Errors," *IEEE*, pp. 127–133 (1982).

Feridun, A.M., and Shin, K.C., "A Fault–Tolerant Multiprocessor System With Rollback Recovery Capabilitiesm," *IEEE*, pp. 283–298 (1981).

Lee, P.A., Ghanl, N., and Heron, K., "A Recovery Cache for the PDP–11", *IEEE Transactions on Computers*, vol. C–29, No. 6, pp. 540–549 (1980).

P. Bernstein, "Sequoia: A Fault–Tolerant Tightly Coupled Multiprocessor for Transaction Processing," *IEEE Computer*, 21(2):37–45 (Feb. 1988).

R. Sosic, "History Cache: Hardware Support for Reverse Execution," Computer Architecture News, 22(5):11–18 (1994).

Relevant portion of Office Action of Application No. 97 115 030.5 dated Jun. 4, 1999.

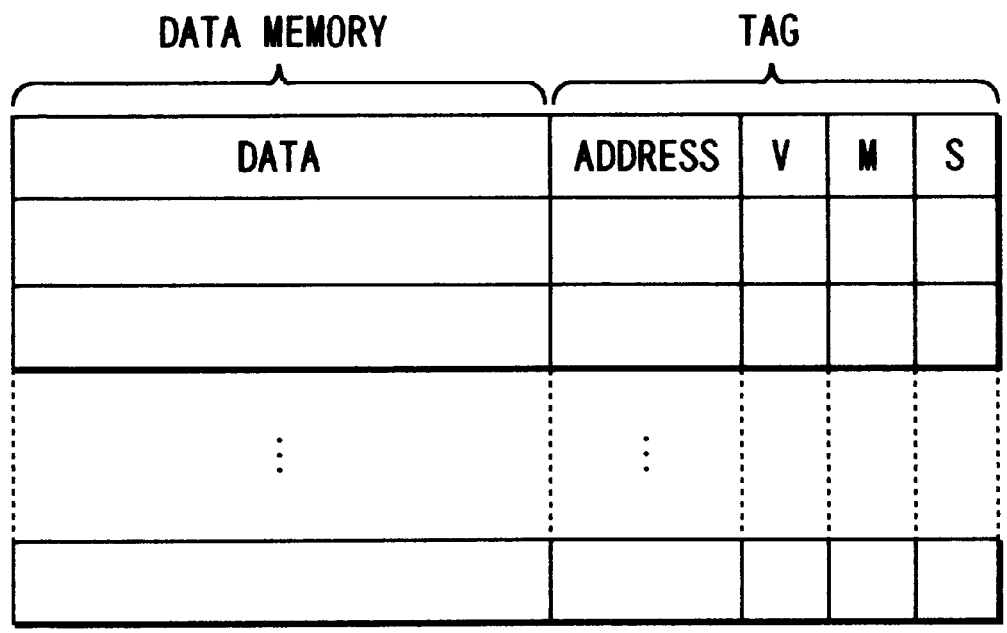
F I G. 3
| VALID V | MODIFIED M | SHARED S | STATUS |
|---|---|---|---|
| 0 | — | — | INVALID |
| 1 | 0 | 0 | CLEAN-EXCLUSIVE |
| 1 | 0 | 1 | CLEAN-SHARED |
| 1 | 1 | 0 | MODIFIED |
F I G. 4

MEMORY UPDATE HISTORY STORING APPARATUS AND METHOD FOR RESTORING CONTENTS OF MEMORY

BACKGROUND OF THE INVENTION

The present invention relates to an apparatus and method for storing update history information of a main memory required to realize a memory state restore function for restoring contents of the main memory of a computer system.

This application is based on Japanese Patent Application No. 8-279027, filed Sep. 30, 1996, the content of which is incorporated herein by reference.

In a normal computer system, when a program is executed and processing once proceeds, no processing can be generally restarted by returning memory contents to a previous state.

However, in the following application techniques of various kinds, it is desirable to have a function (a memory status restore function) for returning the memory contents to a previous state and continuing the processing from that time point.

(1) Software Debugging

When a certain error occurs during execution of a program, a cause of this error can be analyzed by returning to a previous state.

(2) Fault Tolerant System

When no processing can be continuously performed due to a certain fault during an operation of the system, the system can be continuously operated without stopping this system by returning the system to a previous state and restarting processing from this state.

For example, such a fault tolerant technique is disclosed in Philip A Bernstein, "Sequoia: A Fault-Tolerant Tightly Coupled Multiprocessor for Transaction Processing," IEEE Computer, Vol.21, No.2, 1988.

(3) Back Tracking

In a programming language of a logic type, back tracking in an executing state is a basic operation. The back tracking can be realized by using a function for returning the contents of a memory to a previous state.

A "backward technique" is one of techniques considered as a method for realizing the above memory state restore function. For example, such a technique is disclosed in Rok Sosic, "History Cache: Hardware Support for Reverse Execution" Computer Architecture News, Vol.22, No.5, 1994.

FIG. 1 shows the construction of a conventional typical computer system required to realize the memory state restore function using the "backward technique".

In the system of FIG. 1, N CPUs $31_1$ to $31_N$ and N cache memories $41_1$ to $41_N$ respectively corresponding to these CPUs are arranged. The cache memories $41_1$ to $41_N$ are connected to a memory controller 60 through a system bus 50.

The memory controller 60 is connected to a main memory 70 and a before-image buffer 80 and controls access to the main memory 70 and the before-image buffer 80. The before-image buffer 80 is used to hold update history information (before-image). The update history information is constructed by a set of previous data of the main memory 70 and its address.

When a writing request for the main memory 70 is issued, the memory controller 60 reads previous data from the main memory 70 before the actual write access to the main memory 70. The memory controller 60 then writes these read data and a corresponding update address to the before-image buffer 80.

Contents of the main memory 70 can be restored in a state prior to occurrence of a fault by this construction only by writing-back the update history information from the before-image buffer 80 to the main memory 70 when a fault occurs.

However, in this system, it is necessary to assemble a buffer access control function for controlling access to the before-image buffer 80, a state storing control function for controlling various kinds of functions required to hold a state of the main memory 70, etc. into the memory controller 60. Therefore, no existing memory controller can be utilized so that a dedicated memory controller for the memory controller 60 :must be newly developed. Accordingly, it is really difficult to realize the memory state restore function by using the existing computer system as it is.

BRIEF SUMMARY OF THE INVENTION

Accordingly, it is an object of the present invention to provide a memory update history storing apparatus and method capable to easily realize a memory state restore function by using an existing computer system as it is without changing a memory controller of the existing computer system.

According to the present invention, there is provided a memory update history storing apparatus which is used in a computer system having at least one CPU, at least one cache memory respectively arranged in accordance with the at least one CPU, a main memory, a memory controller for controlling an operation of this main memory and a bus for connecting the at least one cache memory and the memory controller, and stores update history information required to restore stored contents of the main memory and which comprises a buffer for storing a set of previous data of the main memory and its update address as the update history information, and buffer access control device connected to the bus and controlling a writing operation of the update history information into the buffer. The buffer access control may issue a read command for reading data of the main memory as an object of a write access request onto the bus in response to a command issued onto the bus from a cache memory when the CPU issues the write access request to the cache memory corresponding to the CPU, and update history writing device for storing data read from the main memory onto the bus by the memory controller in response to the issuance of the read command and an address corresponding to these data to the buffer.

In this memory update history storing apparatus, the buffer access control device is arranged separately from the memory controller and is connected to the bus. The buffer access control means is not operated when a write access request to the main memory is sent to the memory controller. When there is a write access request from a CPU to a cache memory corresponding to this CPU, the buffer access control device is automatically operated in response to a command issued from this cache memory onto the bus. For example, the buffer access control device is automatically operated in response to an invalidation command for designating invalidation of a cache line corresponding to other cache memories connectable to the bus. Namely, when the invalidation command is detected, the buffer access control device issues a read command for reading data of the main memory as an object of the write access request onto the bus by using an address of a cache line designated by this invalidation command, etc. Data read from the main memory onto the bus by the memory controller in response to this read command, and an address corresponding to these data are written to the buffer by the buffer access control device.

Thus, the buffer access control device operable independently of the memory controller, is arranged so that a memory state restore function can be easily realized by using an existing computer system as it is without changing a memory controller of the existing computer system.

Further, previous data are obtained at a writing time of data to the cache memory instead of a writing time of data to the main memory. Accordingly, when the present invention is applied to a system using a system restoring technique by checkpoint/rollback, it is sufficient to write modified data held in the cache memory to the main memory at a checkpoint time and it is not necessary to hold the previous data to the buffer at this time point. Therefore, overhead of checkpoint processing can be reduced.

Further, the buffer access control device does not issue a command onto the bus when a command issued from the cache memory is a read-and-invalidation command for designating a reading operation of data from a corresponding cache line of other cache memories connectable to the main memory or bus and invalidation of the corresponding cache line of other cache memories. In this case, data and a corresponding address read onto the bus by the read-and-invalidation command from the cache memory are utilized as they are, and can be held in the buffer.

Additional objects and advantages of the present invention will be set forth in the description which follows, and in part will be obvious from the description, or may be learned by practice of the present invention.

The objects and advantages of the present invention may be realized and obtained by the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a view showing an example of the construction of a cache memory arranged in the multiprocessor system in this embodiment;

FIG. 4 is a view showing a state of cache line data held in the cache memory arranged in the multiprocessor system in this embodiment;

DETAILED DESCRIPTION OF THE INVENTION

A preferred embodiment of a memory update history storing apparatus according to the present invention will now be described with reference to the accompanying drawings.

Figure 1:
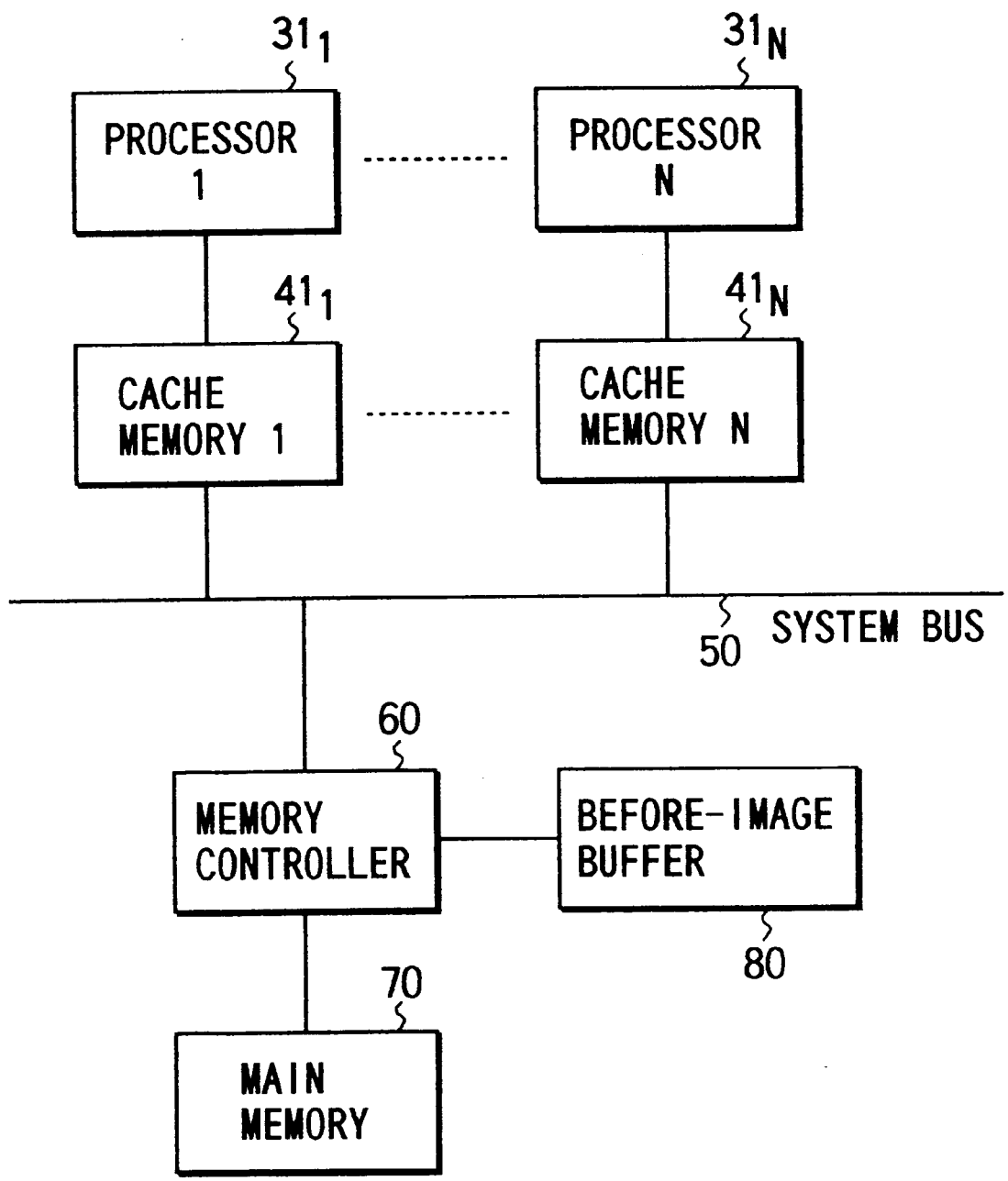
FIG. 1 is a block diagram showing the construction of a conventional multiprocessor system required to realize a memory restore function.
Figure 2:
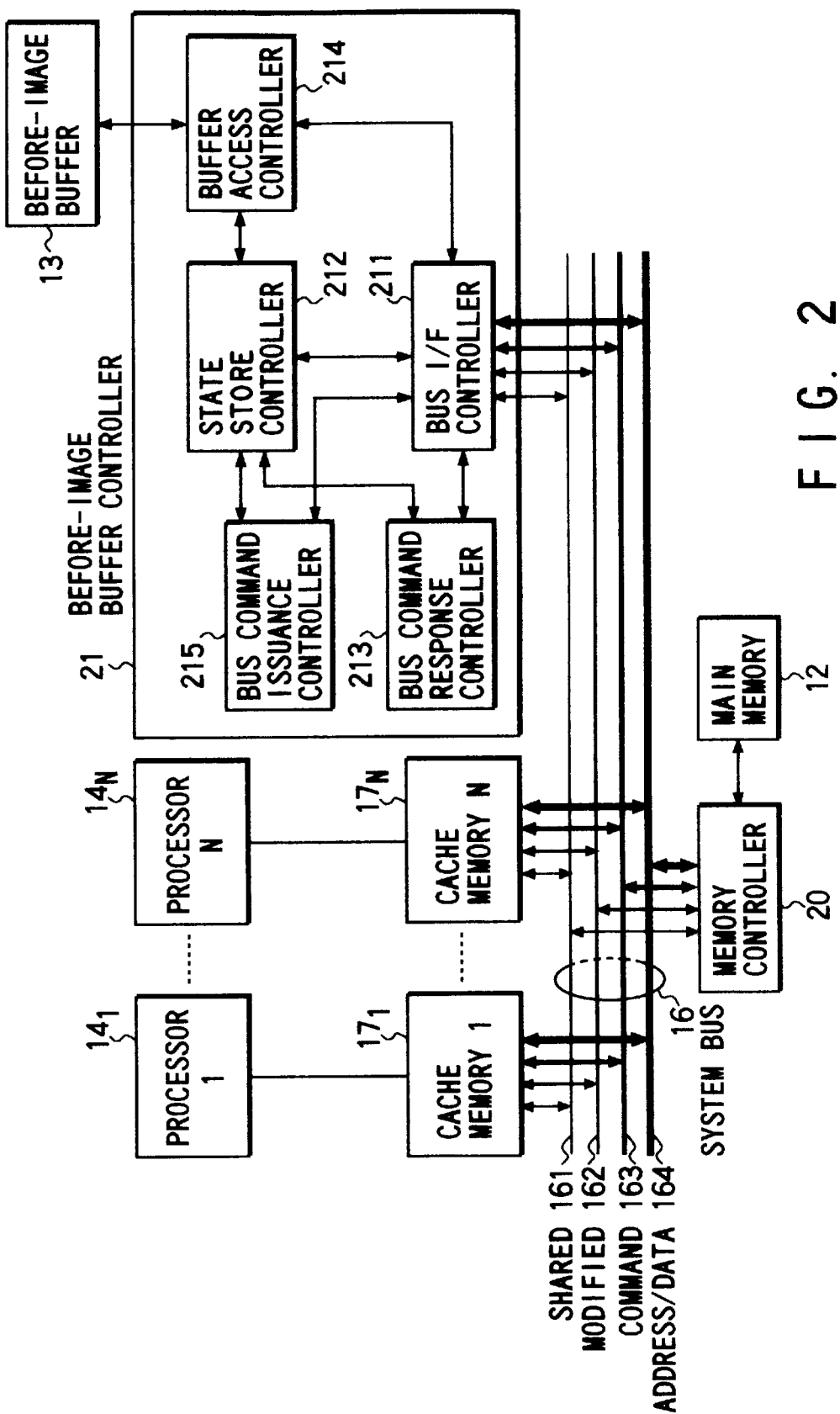
FIG. 2 is a block diagram showing the construction of a multiprocessor system using a memory update history storing apparatus in accordance with a first embodiment of the present invention.

FIG. 2 shows the construction of a computer system in accordance with a first embodiment of the present invention. As shown in FIG. 2, N CPUs (processors) $14_1$ to $14_N$ and N cache memories $17_1$ to $17_N$ respectively corresponding to these N CPUs are arranged in the computer system. The cache memories $17_1$ to $17_N$ are connected to a system bus 16 together with a memory controller 20 and a before-image buffer controller 21.

The memory controller 20 is constructed by a normal memory controller for controlling access to a main memory 12. The before-image buffer controller 21 is used to control the operation of a before-image buffer 13 for storing a set of previous data of the main memory 12 and its address in a stack form. The before-image buffer controller 21 has a bus interface controller 211, a state store controller 212, a bus command response controller 213, a buffer access controller 214 and a bus command issuance controller 215.

The bus interface controller 211 is directly connected to the system bus 16 and controls an operation of the system bus 16 and snoops the system bus 16 (monitors a bus command). Namely, the bus interface controller 211 monitors the system bus 16 at any time and is operated in accordance with commands issued to the system bus 16. The state store controller 212 controls various kinds of functions required to hold an operating state of the main memory 12. The bus command response controller 213 controls a function for making a response to a command issued to the system bus 16. The buffer access controller 214 is connected to the before-image buffer 13 and controls access to the before-image buffer. The bus command issuance controller 215 controls a function for issuing a bus command required to hold an operating state of the main memory 12 to the before-image buffer 13.

The cache memories $17_1$ to $17_N$ are constructed by cache memories of a copy back type and a protocol for maintaining data coherency is realized in accordance with a system explained below. Each of these cache memories $17_1$ to $17_N$ functions as a secondary cache memory when a primary cache memory exists in each of the corresponding CPUs (processors) $14_1$ to $14_N$. These cache memories $17_1$ to $17_N$ themselves may be built in the corresponding CPUs.

As shown in FIG. 3, the cache memories $17_1$ to $17_N$ are constructed by many cache lines such as $2^x$ cache lines (also called cache blocks). Each of the cache lines has a data memory for storing cache line data (e.g., 64 bytes) and a tag memory (e.g., 4 bytes) for storing information for managing each of the cache line data held in the data memory.

An address tag showing a cache line address "ADDR" of corresponding cache line data and data of 3 bits showing a state of the cache line data are held in the tag memory. The state of the cache line data is managed by a combination of 3-bit data of valid "V", modified "M" and shared "S". The valid "V" indicates that the corresponding cache line data are effective. The modified "M" indicates a state updated in the cache memories. The shared "S" indicates that the same cache line data may also be held in a cache memory of another processor. As shown in FIG. 4, the cache line data are set to four states composed of "Invalid", "Clean Exclusive", "Clean Shared" and "Modified" states by a combination of these 3-bit data.

Bus commands to be monitored in the present invention include the following commands in which are issued from a copy back cache memory. "Read-line" command: Read command of the cache line data from the main memory to the cache memory.

This command is issued when no corresponding effective cache line data exist in the cache memory and a cache miss occurs in response to read access to a cache line at a certain address from a CPU. The cache miss occurs when no address showing cache line data as an accessed object is held in the tag memory, or this address is held in the tag memory but the valid bit "V" shows invalid ("0"). In contrast to this, a cache hit is the case when an address of the cache line data as an object is held in the tag memory, and the valid bit "V" shows valid ("1").

"Read-Line-with-Invalidate" command: Command for reading the cache line data from the main memory to the cache memory and invalidating data held in other cache memories.

This command is issued when a cache miss occurs in response to write access from a CPU. Namely, when the cache miss occurs for the write access from the CPU, it can be anticipated that mismatching occurs between the cache memory and other cache memories storing the same cache line data at that time. This is because the cache line data as a writing object are refilled from the main memory to the cache memory and are then rewritten. Accordingly, when the cache miss occurs in response to the write access from the CPU, a command for reading the cache line data and simultaneously designating invalidation of data held in other cache memories is executed.

"Write-Line" command: Write command of the cache line data from the cache memory to the main memory.

This command is issued when the cache line data are explicitly written to the main memory 12 by an instruction from a CPU, and a request for replacing the cache line data is generated and modified data are written to the main memory 12, and the modified data are written to the main memory 12 in accordance with a request from another CPU.

"Invalidate" command: Command for invalidating data held in other cache memories.

This command is issued when a corresponding cache line exists in the cache memory in response to write access from a CPU, but shows a "Clean Shared" state. The "Clean Shared" state is a state in which the same cache line data may exist in other cache memories and have the same value. In this command, a transfer operation for only an address showing the cache line data as an invalidating object is performed, but no data are transferred.

In addition to these commands, the following bus command is supported.

"Read-Line-Non-Snoop" command: Other cache memories do not snoop and the memory controller makes a response at any time and line data are read from the main memory. In this embodiment, this command is not issued from a processor and the cache memory.

There are other commands supported in many cases in addition to the above commands, but an explanation of these commands is omitted since these commands do not directly relate to the following description.

When the cache memories $17_1$ to $17_N$ are built in the corresponding CPUs, the above commands are issued by the CPUs themselves.

The system bus 16 is constructed by a processor bus, etc. capable of supporting the construction of a multiprocessor. The system bus 16 includes a shared response signal line 161, a modified response signal line 162, a bus command signal line 163 and an address/data signal line 164. In general, the system bus 16 further includes a signal line for performing arbitration, etc., but an explanation of this signal line, etc. is omitted since this signal line, etc. does not directly relate to the following description.

The shared response signal line 161 is used to inform that cache line data as an object of a command issued by another CPU and other cache memories are held, namely, shared.

The modified response signal line 162 is used to inform that cache line data as an object of a command issued by another CPU and other cache memories are held in a modified state. When this signal is asserted, the command is aborted. Thereafter, a slave aborting this command acquires a system bus and then writes the updated cache line data to a memory. On the other hand, a master issuing a first command issues the same command after the master again acquires the system bus.

The command is also aborted when the shared response signal line 161 and the modified response signal line 162 are simultaneously asserted.

The bus command signal line 163 shows kinds of the above bus commands and is used to send various kinds of information relative to commands.

The address/data signal line 164 is a signal line for sending art address of cache line data as an object of a bus command and data. This signal line 164 is shown together as one signal line in FIG. 2. However, this signal line may be constructed by each of a system for using common signal lines in time division and a system for arranging an independent signal line at each of address/data.

An operation of the multiprocessor of FIG. 2 will be explained. Namely, how to realize the data coherency maintaining protocol between cache memories using the above bus commands will next be explained.

Here, this explanation relates to each of operations of a CPU and a cache memory (master processor) on an access starting side by issuing commands, a CPU and a cache memory (slave processor) operated in response to a command issued from another CPU and other cache memories, a memory controller 20 and a before-image buffer controller 21.

(1) Operation of Master Processor

An operation of the master processor for starting access by issuing a command and a state transition of a cache memory corresponding to the issued command will first be explained. In the following explanation, the master processor is set to a CPU $14_1$ (cache memory $17_1$).

Read access (cache hit): When the CPU $14_1$ requests read access and a cache hit is performed in the cache memory $17_1$ as a result of this request, corresponding data are read out of the cache memory $17_1$. CPU $14_1$ (cache memory $17_1$) issues no command to the system bus 16. At this time, no cache line state is changed.

Read access (cache miss): When the CPU $14_1$ requests read access and a cache miss occurs in the cache memory $17_1$ as a result of this request, the CPU $14_1$ (cache memory $17_1$) issues a "Read-Line" command to the system bus 16.

In response to this, if a modified response signal is asserted through the modified response signal line 162, one of the other cache memories $17_2$ to $17_N$ holds modified data of this line. Thereafter, the cache memory $17_1$ reads cache line data written to the main memory 12 by the cache memory asserting the modified response signal, and holds the read cache line data to a data memory of this cache memory. A cache line state is set to a "Clean Shared" state.

In contrast to this, if modified response signal is not asserted and a shared response signal is asserted through the shared response signal line 161, other cache memories holds this line in a clean state. The cache memory $17_1$ sets the cache line state to a "Clean Shared" state and inputs data read from the main memory 12 and holds these data to the data memory.

When any one of the modified response signal and the shared response signal is not asserted, no cache line as an object is held in any cache memory. The cache memory $17_1$ sets the cache line state to a "Clean Exclusive" state. In this case, the cache memory $17_1$ also inputs data read from the main memory 12 and holds these data to the data memory. However, as described later, a control operation is performed in this system such that clean exclusive state is avoided. Accordingly, this condition does not actually exist.

In each of the above cases, the cache memory $17_1$ returns required data in the cache line data inputted from the system bus 16 to the CPU 14.

Write (cache hit/modified): When the CPU $14_1$ requests write access and a cache hit is performed in the cache memory $17_1$ as a result of this request and corresponding cache line data is held in a modified state, data are written to a corresponding cache line. CPU $14_1$ (cache memory $17_1$) issues no command to the system bus 16. At this time, no cache line state is changed.

Write (cache hit/clean exclusive): When the CPU $14_1$ requests write access and a cache hit is performed in the cache memory $17_1$ as a result of this request and corresponding cache line data is held in a clean exclusive state, data are written to a corresponding cache line. CPU $14_1$ (cache memory $17_1$) issues no command to the system bus 16. The cache memory $17_1$ changes a state of the corresponding cache line to a "Modified" state. However, as described later, a control operation is performed in this system such that clean exclusive state is avoided. Accordingly, this condition does not actually exist.

Write (cache hit/clean shared): When the CPU $14_1$ requests write access and a cache hit is performed in the cache memory $17_1$ as a result of this request and corresponding cache line data is held in a "Clean Shared" state, the CPU $14_1$ (cache memory $17_1$) issues an "Invalidate" command to the system bus 16. Thereafter, the cache memory $17_1$ sets the state of a corresponding cache line to a "Modified" state and writes data.

Write (cache miss): When the CPU $14_1$ requests write access and a cache miss occurs in the cache memory $17_1$ as a result of this request, a "Read-Line-with-Invalidate" command is issued to the system bus 16.

In response to this, if a modified response signal is asserted, one of the other cache memories $17_2$ to $17_N$ holds modified data on this line. Thereafter, the cache memory $17_1$ reads cache line data written to the main memory 12 by a cache memory asserting the modified response signal, and holds the read cache line data to the data memory.

In contrast to this, if modified response signal is not asserted, the cache memory $17_1$ inputs data read from the main memory 12 and holds these data to the data memory.

In each of these cases, the state of a corresponding cache line is set to a "Modified" state and data are written.

(2) Operation of Slave Processor

Operations and state transitions of a processor and a corresponding cache memory (slave processor) in response to commands issued from another processor and a cache memory will next be explained. The master processor is set to a CPU $14_1$ (cache memory $17_1$) and the slave processor is set to a CPU $14_N$ (cache memory $17_N$). The explanation occurs every command issued by the master processor $14_1$.

Response to "Read-Line" command:

When the cache memory $17_N$ holds cache line data as an object of a "Read-Line" command in a "Modified" state, a modified response signal is asserted through the modified response signal line 162 and it is informed that modified data are held. Thereafter, the cache memory $17_N$ issues a "Write-Line" command and writes modified data to the main memory 12. The cache memory $17_N$ sets the state of a corresponding cache line to a "Clean Shared" state.

When the cache memory $17_N$ holds cache line data as an object of the "Read-Line" command in a "Clean Exclusive" or "Clean Shared" state, the cache memory $17_N$ asserts a shared response signal through the shared response signal line 161 and informs that clean data are held. In each of these cases, the cache memory $17_N$ sets the states of a corresponding cache line to a "Clean Shared" state.

The cache memory $17_N$ performs nothing when cache memory $17_N$ does not hold corresponding effective cache line data.

Response to "Read-Line-with-Invalidate" command:

When the cache memory $17_N$ holds cache line data as an object of a "Read-Line-with-Invalidate" command in a "Modified" state, the cache memory $17_N$ asserts a modified response signal through the modified response signal line 162 and informs that modified data are held. Thereafter, the cache memory $17_N$ issues a "Write-Line" command and writes the modified data to the main memory 12. The cache memory $17_N$ also sets the state of a corresponding cache line to an "Invalid" state.

When the cache memory $17_N$ holds cache line data as an object of the "Read-Line-with-Invalidate" command in a "Clean Exclusive" or "Clean Shared" state, the cache memory $17_N$ sets the state of a corresponding cache line to an "Invalid" state.

The cache memory $17_N$ performs nothing when no cache memory $17_N$ does not hold corresponding effective cache line data.

Response to "Invalidate" command:

When the cache memory $17_N$ holds cache line data as an object of an "Invalidate" command in a "Clean Exclusive" or "Clean Shared" state, the cache memory $17_N$ sets the state of a corresponding cache line to an "Invalid" state.

The caches memory $17_N$ performs nothing when cache memory $17_N$ does not hold corresponding effective cache line data.

In this case, no corresponding line is held in a "Modified" state.

Response to "Write-Line" command:

The cache memory $17_N$ performs nothing.

Response to "Read-Line-Non-Snoop" command:

The cache memory $17_N$ performs nothing.

(3) Operation of Memory Controller 20

The memory controller 20 performs the following operation in response to each of bus commands.

Response to "Write-Line" command:

When a "Write-Line" command issued to the system bus 16 is snooped, the memory controller 20 inputs cache line data written out of a cache memory and writes these data to the main memory 12 at its corresponding address.

Response to "Invalidate" command:

The memory controller 20 performs nothing.

Responses to "Read-Line" and "Read-Line-with-Invalidate" commands:

The memory controller 20 performs the same operation in response to these two commands.

The memory controller 20 performs nothing when a modified response signal to these commands is asserted. This shows that a cache memory of an asserted slave processor already holds modified data. In this case, subsequent to these commands, a "Write-Line" command is issued by this cache memory and modified data are written out.

In contrast to this, when no modified response signal is asserted, cache line data are read out of a memory location shown by an address of a cache line as an access object and are outputted to the system bus 16.

Response to "Read-Line-Non-Snoop" command:

Cache line data are read from a memory location shown by an address of a cache line as an access object and are outputted to the system bus 16.

(4) Operation of Before-image Buffer Controller 21

An operation of the before-image buffer controller 21 in response to each of bus commands will next be explained every command issued to the system bus 16.

Response to "Read-Line" command:

When the bus interface controller 211 snoops a "Read-Line" command issued to the system bus 16, the state store controller 212 starts an operation of the bus command response controller 213. The bus command response controller 213 asserts a shared response signal through the bus interface controller 211. Thus, the state of a cache line as a processed object of a cache memory of the master processor at present can be set to a "Clean Shared" state instead of a "Clean Exclusive" state. Thus, thereafter, when write access to this cache line occurs, issuance of an "Invalidate" command can be caused so that data prior to update can be held.

When the processor and the cache memory has a function for avoiding the "Clean Exclusive" state, it is not necessary for the before-image buffer controller 21 to assert the shared response signal.

Response to "Invalidate" command:

When the bus interface controller 211 snoops an "Invalidate" command issued to the system bus 16, the state store controller 212 starts an operation of the bus command response controller 213. The bus command response controller 213 asserts a shared response signal and a modified response signal through the bus interface controller 211. Thus, the "Invalidate" command is aborted. Thereafter, the master processor reissues the same command after the master processor again acquires the system bus.

The bus command response controller 213 continuously aborts the reissued "Invalidate" command by asserting the shared response signal and the modified response signal until the following processing is completed.

The state store controller 212 starts an operation of the bus command issuance controller 215. The bus command issuance controller 215 issues a "Read-Line-non-Snoop" command with regard to a memory location shown by an address of a cache line as an invalidating object obtained through the bus interface controller 211 to obtain cache line data prior to update. The bus command issuance controller 215 then reads data prior to the update from the main memory 12.

Further, the state store controller 212 starts an operation of the buffer access controller 214 so that cache line data read from the main memory 12 and outputted to the system bus 16 by the memory controller 20 are transferred from the bus interface controller 211 to the buffer access controller 214, and are written to the before-image buffer 13 together with an address value.

When this processing is terminated, the bus command response controller 213 stops aborting the reissued "Invalidate" command.

The state store controller 212 also holds an address of a cache memory block in which the above processing is executed. Thereafter, when the "Invalidate" command with regard to the same address is reissued, the state store controller 212 neglects this command.

Figure 5:
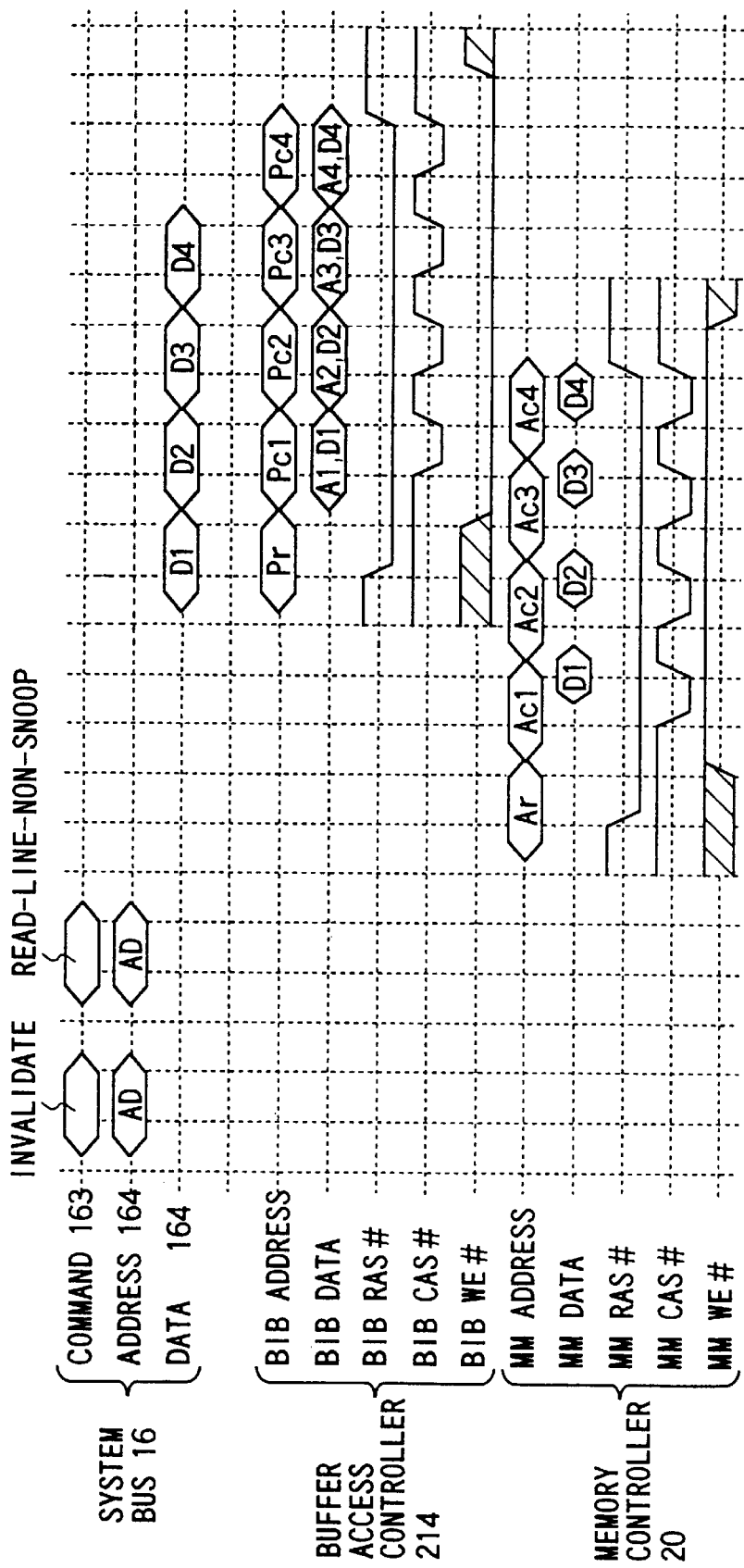
FIG. 5 is a timing chart showing an acquisition operation of memory update history information in the multiprocessor system in this embodiment.

FIG. 5 shows operating timing of response processing to the above "Invalidate" command. When the bus command issuance controller 215 confirms the "Invalidate" command, the bus command issuance controller 215 uses an address (AD) at that time and starts a "Read-Line-non-Snoop" command for reading previous data (D1 to D4) at the address (AD) from the main memory 12. At this time, each of the cache memories does not perform a snooping operation in response to this command.

The memory controller 20 controls operations of an address line (MM address), a data line (MM data) and a read write control line (MM RAS#, MM CAS#, MM WE#) arranged between the memory controller 20 and the main memory 12 in response to the "Read-Line-non-Snoop" command so that the memory controller 20 reads cache line data (D1 to D4) from the main memory 12 at its address (AD) and outputs the read cache line data onto a data bus of the system bus 16.

In the before-image buffer controller 21, the address (AD) is also transmitted to the buffer access controller 214. The buffer access controller 214 controls operations of an address line (BIB address), a data line (BIB data) and a read write control line (BIB RAS#, BIB CAS#, BIB WE#) arranged between the buffer access controller 214 and the before-image buffer 13 so that a set of the address (AD) and the data (D1 to D4) outputted onto the data bus of the system bus 16 is stacked to a corresponding entry of the before-image buffer 13.

Response to "Read-Line-with-Invalidate" command:

When a modified response signal is asserted by issuance of a "Read-Line-with-Invalidate" command, an asserting cache memory shows that it holds modified data, and it is known that its processor executes write access after a newest checkpoint. Therefore, at that time point, previous data are held in the before-image buffer 13 so that it is not necessary to newly store data at this address to the before-image buffer 13. Accordingly, the state store controller 112 performs nothing.

In contrast to this, when modified response signal is not asserted by the issuance of the "Read-Line-with-Invalidate" command, the buffer access controller 214 is started so that cache line data read from the main memory 12 and outputted to the system bus 16 by the memory controller 20 are transferred from the bus interface controller 211 to the buffer access controller 214, and are written to the before-image buffer 13 together with an address value.

In this case, it is not necessary to issue the "Read-Line-non-Snoop" command.

Response to "Write-Line" command: Nothing is done.

Next, checkpoint processing in the multiprocessor system which operates as mentioned above will next be explained.

The checkpoint/rollback processing is a system restoring method of periodically storing information relating to the execution state of the system (this periodical storing is called a checkpoint processing) and restarting processing by rollback to a previous checkpoint when a fault occurs.

At a checkpoint timing, internal states of processors $14_1$ to $14_N$ are written to the main memory 12 and all cache line data of the respective cache memories $17_1$ to $17_N$ in a "Modified" state are written back to the main memory 12. The internal states of the processors are also actually written to the main memory 12 through the cache memories so that no special consideration is required on bus commands. Each of the cache memories $17_1$ to $17_N$ sets the state of a cache line written back to the main memory 12 to a "Clean Shared" or "Invalid" state. The cache line data are written back to the main memory 12 by using a "Write-Line" command. Therefore, at this time, no data storage to the before-image buffer 13 occurs.

Contents of the before-image buffer 13 are cleared when a checkpoint is normally obtained. When normal processing is then restarted, update history information begins to be written to the before-image buffer 13. At a rollback time, an operating state of the main memory 12 is also restored in a state at the previous checkpoint as well as the internal states of the respective CPUs. This state of the main memory 12 is restored by sequentially reading previous data accumulated in the before-image buffer 13 and writing these data bask to the main memory 12 at its corresponding address.

In accordance with this system, at the checkpoint time, it is sufficient to write modified data in a copy back cache memory to the main memory 12 and it is not necessary to hold previous data to the before-image buffer 13 at this time point. Therefore, overhead of the checkpoint processing can be reduced.

As mentioned above, in this embodiment, the before-image buffer controller 21 is arranged separately from the memory controller 20 constructed by a normal memory controller and is connected to the system bus 16. The before-image buffer controller 21 is not operated when a write access request in response to the main memory 12 is sent to the memory controller 20. When there is a write access request from a CPU to a cache memory corresponding to this CPU, the before-image buffer controller 21 is automatically started in response to a command issued from this cache memory onto the system bus 16, and issues a command for reading previous data from the main memory 12. Since the before-image buffer controller 21 operable independently of the memory controller 20 is provided, it is possible to easily realize a memory state restore function by using an existing computer system as it is without changing the memory controller 20 of the existing computer system.

In this embodiment, the operation of the before-image buffer controller 21 in response to an "Invalidate" command and a "Write-Line" command can be changed as follows.

Response to "Invalidate" command:

When the bus interface controller 211 snoops an "Invalidate" command issued to the system bus 16, the state store controller 212 starts an operation of the bus command response controller 213. The bus command response controller 213 continuously asserts and aborts a modified response signal to a "Write-Line" command at the same address until the following processing is completed.

The state store controller 212 starts an operation of the bus command issuance controller 215. The bus command issuance controller 215 issues a "Read-Line-non-Snoop" command with regard to a memory location shown by an address of a cache line as an invalidating object obtained through the bus interface controller 211 so as to obtain cache line data before update.

Further, the state store controller 212 starts an operation of the buffer access controller 214 so that cache line data read from the main memory 12 and outputted to the system bus 16 by the memory controller 20 are transferred from the bus interface controller 211 to the buffer access controller 214, and are written to the before-image buffer 13 together with an address value.

When this processing is terminated, the bus command response controller 213 stops abortion in response to the "Write-Line" command at the same address.

Response to "Write-Line" command:

As mentioned above, when the bus interface controller 211 snoops the "Write-Line" command issued to the system bus 16 during reading processing of before-update cache line data in response to the "Invalidate" command, the bus command response controller 213 asserts and aborts a shared response signal and a modified response signal if the "Write-Line" command is snooped at the same address.

Nothing is done in a case except for execution of this processing and a case in which this processing is executed but is performed at a different address.

Further, in the above explanation, the before-image buffer 13 is constructed by an independent memory and is connected to the before-image buffer controller 21. However, the before-image buffer can be also realized by utilizing one portion of the main memory 12. This modification is shown in FIG. 6.

Figure 6:
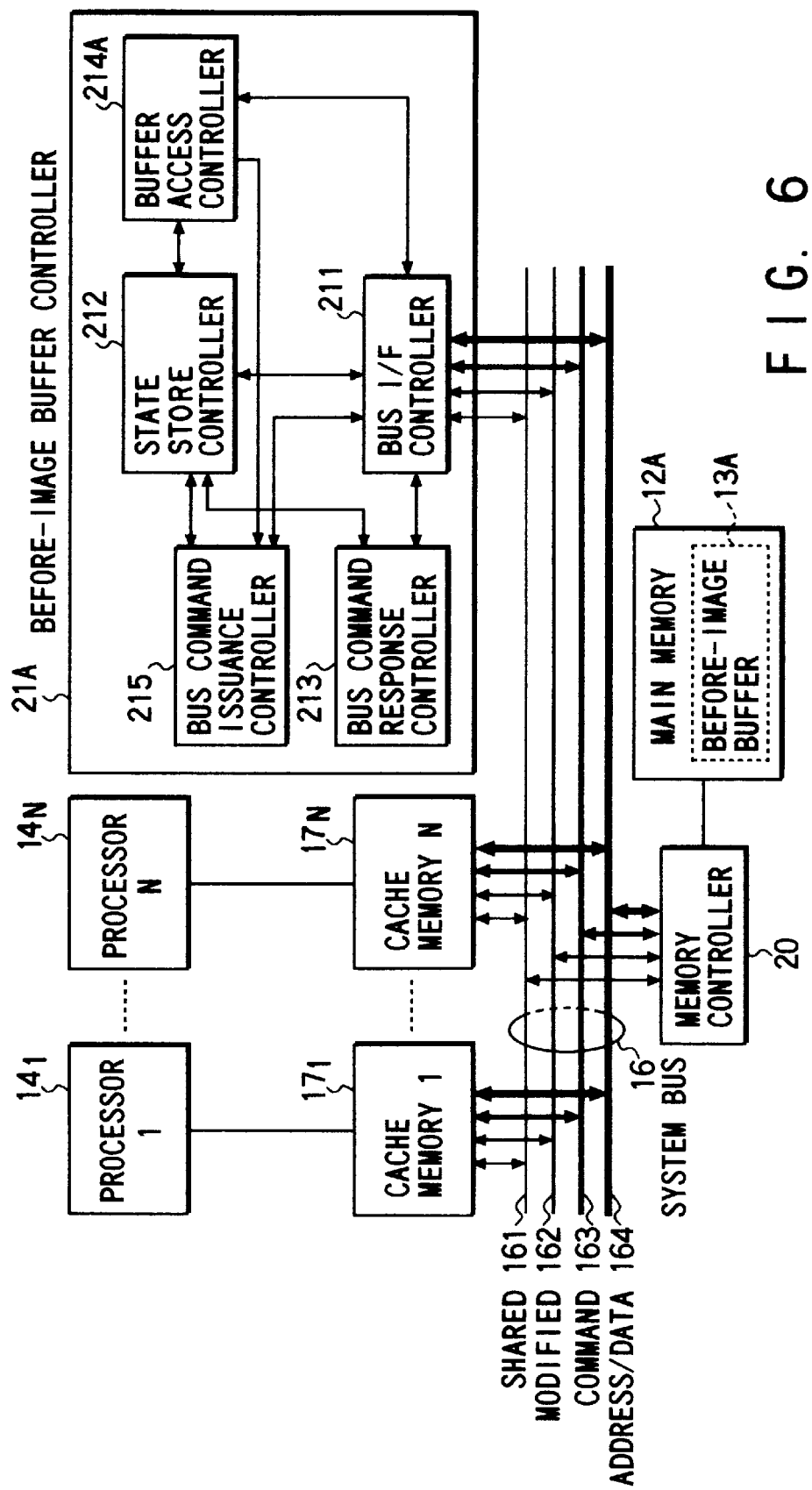
FIG. 6 is a block diagram showing a constructional example as a modified example of the memory update history storing apparatus in this embodiment.

In a system construction of FIG. 6, a before-image buffer 13A is realized by using a memory area of one portion of a main memory 12A. A buffer access controller 214A is also connected to a bus command issuance controller 215 and has a function for issuing a command to a system bus 16 to get access to the before-image buffer 13A.

When previous data and an update address are transferred to the buffer access controller 214A, the buffer access controller 214A starts an operation of the bus command issuance controller 215 to hold the previous data and the update address to the before-image buffer 13A in the main memory 12A. The command issuance controller 215 issues two "Write-Line" commands through the bus interface controller 211.

One of the two "Write-Line" commands is used to hold the previous data and the other is used to hold an address of these previous data.

In accordance with this modification, it is not necessary to arrange two independent memories so that the system can be cheaply constructed.

In the above first embodiment, the cache memory is of a copy back type, but the previous data can be held in the cache memory of a write-through type in the following way.

Here, the following explanation will be made in a case in which the cache memories $17_1$ to $17_N$ in FIG. 2 have a function for operating these cache memories in a write through mode as an example. However, similar contents can be realized even when dedicated cache memories for only write through are used.

States of the cache memories operated in the write through mode are constructed by two kinds of states composed of (1) an "Invalid" state and (2) a "Valid" state. When the "Valid" state is set to a "Clean Shared" state as one example, the states of the cache memories can be managed by two states composed of the "Invalid" and "Clean Shared" states by using a state managing table of FIG. 4. In the write through case, the same data are written to the main memory and the cache memories at any time so that there is no "Modified" state.

The following two kinds of commands outputted from the cache memories $17_1$ to $17_N$ to the system bus 16 are supported.

"Read-Line" command: Read cache line data.

This command is the same as the first embodiment and is issued when no corresponding effective cache line data exist in the cache memories in response to read access to a cache line at a certain address from a CPU and a cache miss occurs.

"Write-Word" command: Write data.

This command is issued irrespective of existence or nonexistence of corresponding data in a cache memory in response to write access from a CPU.

The system bus 16 has the same construction as the first embodiment. However, this embodiment uses only a function in which a shared response signal line 161 and a modified response signal line 162 abort this command when the shared response signal line 161 and the modified response signal line 162 are simultaneously asserted.

How to realize the data coherency maintaining protocol between cache memories by using the above-mentioned bus command will next be explained in a cache memory performing a write through operation. Here, similar to the first embodiment, operations of a master processor, a slave processor, a memory controller 20 and a before-image buffer controller 21 will be respectively explained.

(1) Operation of Master Processor

An operation of the master processor for starting access by issuing a command and a state transition of a cache memory corresponding to the issued command will first be explained. The master processor is set to a CPU $14_1$ (cache memory $17_1$) in the following explanation.

Read Access (Cache Hit)

When the CPU $14_1$ requests read access and a cache hit is performed in the cache memory $17_1$ as a result of this request, corresponding data are read from the cache memory $17_1$. No CPU $14_1$ (cache memory $17_1$) issues a command to the system bus 16. At this time, no state of a cache line is changed.

Read Access (Cache Miss)

When the CPU $14_1$ requests read access and a cache miss occurs in the cache memory $17_1$ as a result of this request, the CPU $14_1$ (cache memory $17_1$) issues a "Read-Line" command to the system bus 16.

The cache memory $17_1$ sets the state of a cache line to a "Clean Shared" state, and inputs data read from the main memory 12 and holds the inputted data to a data memory.

The cache memory $17_1$ returns required data in cache line data inputted from the system bus 16 to the CPU $14_1$.

Write (Cache Hit)

When the CPU $14_1$ requests write access and a cache hit is performed in the cache memory $17_1$ as a result of this request, the CPU $14_1$ writes corresponding cache line data and issues a "Write-Word" command to the system bus 16 and rewrites data of the main memory 12. At this time, no state of a cache line is changed.

Write (Cache Miss)

When the CPU $14_1$ requests write access and a cache miss occurs in the cache memory $17_1$ as a result of this request, the CPU $14_1$ issues a "Write-Word" command to the system bus 16 and rewrites data of the main memory 12. At this time, no state of a cache line is changed.

(2) Operation of Slave Processor

Operations and state transitions of a processor and a corresponding cache memory (slave processor) in response to commands issued from another processor and a cache memory will next be explained. The master processor is set to a CPU $14_1$ (cache memory $17_1$) and the slave processor is set to a CPU $14_N$ (cache memory $17_N$).

Response to "Read-Line" command:

Nothing is done.

Response to "Write-Word" command:

When the cache memory $17_N$ holds cache line data as an object of a command in a "Clean Shared" state, the cache memory $17_N$ sets the state of a corresponding cache line to an "Invalid" state.

(3) Memory Controller

The memory controller 20 performs the following operation in response to each of bus commands.

Response to "Read-Line" command:

The memory controller 20 reads cache line data from a memory location shown by an address of a cache line as an access object and outputs the cache line data to the system bus 16.

Response to "Write-Word" command:

The memory controller 20 inputs data written out of a cache memory and writes these data to the main memory 12 at its corresponding address.

(4) Before-image Buffer Controller

The operation of the before-image buffer controller 21 in response to each of bus commands will next be explained every command issued to the system bus 16.

Response to "Read-Line" command:

Nothing is done.

Response to "Write-Word" command:

When the bus interface controller 211 snoops a "Write-Word" command issued to the system bus 16, the state store controller 212 starts an operation of the bus command response controller 213. The bus command response controller 213 respectively asserts a shared response signal and a modified response signal to a shared response signal line 161 and a modified response signal line 162 through the bus interface controller 211. Thus, the "Write-Word" command is aborted. Thereafter, the master processor again acquires the system bus and then reissues the same command.

The bus command response controller 213 continuously asserts and aborts the shared response signal and the modified response signal in response to the reissued "Write-Word" command until the following processing is completed.

The state store controller 212 starts an operation of the bus command issuance controller 215. The bus command issuance controller 215 issues a "Read-Line" command with regard to a memory location shown by an address of a cache line as an invalidating object obtained through the bus interface controller 211 so as to obtain cache line data before update.

Further, the state store controller 212 starts an operation of the buffer access controller 214 so that cache line data read from the main memory 12 and outputted to the system bus 16 by the memory controller 20 are transferred from the bus interface controller 211 to the buffer access controller 214, and are written to the before-image buffer 13 together with an address value.

When this processing is terminated, the bus command response controller 213 stops abortion with regard to the reissued "Write-Word" command.

The state store controller 212 holds an address of a cache memory block in which the above processing is executed.

Thereafter, when the "Write-Word" command at the same address is reissued, the state store controller 212 neglects this command.

In this example, previous data are held in a line unit in response to the "Write-Word" command. However, if a reading operation of word data is supported, the previous data may be held in a word unit.

Checkpoint processing in the multiprocessor system operated as mentioned above will next be explained.

The checkpoint processing is realized by writing an internal state of a processor to the main memory. However, the cache memory of a write through type is used so that it is not necessary to write out contents of the cache memory.

The present invention is not limited to the above-mentioned embodiments, but can be variously modified and embodied. For example, a write through cache memory is used as an object in the above explanation. However, a memory state restore function can be realized by similar control even in a more general computer system having no cache memory and a computer system having a non-cachable memory access mode.

The multiprocessor system having plural processors $14_1$ to $14_N$ is described in the above explanation. However, if the cache memory has a similar function (if a processor issues an invalidating command for replacement with data within the cache memory), the present invention can be also applied to a computer system constructed by a single processor. The present invention can be also applied to a case in which the cache memory has a hierarchical structure instead of a single structure. Namely, the present invention can be applied to a system having a CPU and a cache memory corresponding to a multiprocessor.

As explained above, in accordance with the present invention, the before-image buffer controller holds cache line data including previous data held in the main memory to the before-image buffer in accordance with a command issued from a certain cache memory or CPU to the system bus. Therefore, the memory state restore function can be realized by adding the before-image buffer controller to the system bus without changing the system bus, processors, cache memories and a memory controller of the existing computer system. Accordingly, the memory state restore function can be realized by only adding hardware without changing the memory controller of the existing computer system. Therefore, it is possible to use the existing computer system as it is.

Further, previous data are obtained at a writing time of data to a cache memory instead of a writing time of data to the main memory. Accordingly, when the present invention is applied to a system using a system restoring technique by checkpoint/rollback, it is sufficient to write modified data held in the cache memory to the main memory at a checkpoint time. Therefore, it is not necessary to hold the previous data to a buffer at this time point so that overhead of checkpoint processing can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:
1. A computer system comprising:
one processor;
at least one cache memory, coupled to the processor, for storing data responsive to an access request from the processor in accordance with a data consistency maintenance protocol;
a main memory, coupled to a bus, to which data is written and from which data is read;
a memory controller, coupled to the bus and the main memory, for controlling a read operation and a write operation of the main memory;
a buffer memory for storing data stored in the main memory and its address as an update history informaiton; and
a buffer memory access control means, coupled to the bus and the buffer memory, for monitoring a transaction issued on the bus, and when it is detected that a given transaction to invalidate data shared in another cache memory is issued from the processor on the bus in response to a write access, the buffer memory access control means aborts the given transaction and issues a "Read" transaction on the bus for reading data stored in the main memory at an address into which the data is to be written in response to the write access.

2. The computer system according to claim 1, in which said memory access control means comprises means for asserting a shared response signal line and a modified response signal line both included in the bus, thereby aborting the given transaction.

3. The computer system according to claim 1, in which said buffer memory access control means comprises means for asserting a modified response signal line in response to a "Write-Line" transaction to a given address until the buffer memory stores the update history information for the given address, thereby aborting the given transaction.

4. The computer system according to claim 1, in which said buffer memory is configured as a part of the main memory.

5. The computer system according to claim 1, in which said at least one cache memory has a hierarchical structure.

6. The computer system according to claim 1, further comprising multiple processors.

7. The computer system according to claim 1, in which said given transaction is an "Invalidate" transaction.

8. The computer system according to claim 1, in which said processor retries the given transaction after the buffer memory stores the update history information.

9. The computer system according to claim 1, in which said buffer memory access control means does not issue a "Read" transaction in response to a "Read-Line-With invalidate" transaction when the modified response signal line is asserted.

10. The computer system according to claim 1, in which said buffer memory access control means issues a "Read" transaction in response to a "Read-Line-With invalidate" transaction when the modified response signal line is not asserted.

11. The computer system according to claim 1, in which said buffer memory access control means asserts the shared response signal line included in the bus in response to a "Read-Line" transaction and sets a state of a cache line of the cache memory to a "Clean Shared" state.

* * * * *

UNITED STATES PATENT AND TRADEMARK OFFICE
CERTIFICATE OF CORRECTION

PATENT NO. : 6,148,416
DATED : November 14, 2000
INVENTOR(S) : Yoshio Masubuchi

It is certified that error appears in the above-identified patent and that said Letters Patent is hereby corrected as shown below:

<u>Column 16,</u>
Lines 15-16, "informaiton" should read -- information --.
Line 28, before "memory access", insert -- buffer --.
Lines 52-53, ""Read-Line-With invalidate"" should read -- "Read-Line-with invalidate" --.
Line 57, ""Read-Line-With invalidate"" should read -- "Read-Line-with invalidate" --.

Signed and Sealed this

Twenty-first Day of January, 2003

JAMES E. ROGAN
*Director of the United States Patent and Trademark Office*